US010655893B2

(12) United States Patent
Saint Pierre et al.

(10) Patent No.: US 10,655,893 B2
(45) Date of Patent: May 19, 2020

(54) COOLING SYSTEM CAPABLE OF DEFROSTING

(71) Applicant: MPI CORPORATION, Chu-Pei, Hsinchu Shien (TW)

(72) Inventors: Michael Roy Saint Pierre, Chu-Pei (TW); Helge Jacob Krystad, Chu-Pei (TW); Ying-Chiao Chang, Chu-Pei (TW); Yueh-Ying Lee, Chu-Pei (TW)

(73) Assignee: MPI CORPORATION, Chu-Pei, Hsinchu Shien (TW)

( * ) Notice: Subject to any disclaimer, the term of this patent is extended or adjusted under 35 U.S.C. 154(b) by 313 days.

(21) Appl. No.: 15/042,791

(22) Filed: Feb. 12, 2016

(65) Prior Publication Data

US 2016/0238296 A1 Aug. 18, 2016

(30) Foreign Application Priority Data

Feb. 13, 2015 (TW) .............................. 104105133 A
Mar. 11, 2015 (TW) .............................. 104107823 A

(51) Int. Cl.
*F25B 6/04* (2006.01)
*F25B 47/02* (2006.01)
(Continued)

(52) U.S. Cl.
CPC ................ *F25B 6/04* (2013.01); *F25B 40/00* (2013.01); *F25B 47/022* (2013.01);
(Continued)

(58) Field of Classification Search
CPC .. F25B 6/04; F25B 40/02; F25B 40/04; F25B 47/022; F25B 49/022; F25B 49/025;
(Continued)

(56) References Cited

U.S. PATENT DOCUMENTS 9,335,070 B2 * 5/2016 Kobayashi .............. F25B 9/006
2006/0042296 A1 * 3/2006 Ludwig .................. F25B 49/025
62/323.4

(Continued)

FOREIGN PATENT DOCUMENTS

CN         1580670 A    2/2005
CN       101326408 A   12/2008
(Continued)

*Primary Examiner* — Marc E Norman
*Assistant Examiner* — Schyler S Sanks
(74) *Attorney, Agent, or Firm* — Muncy, Geissler, Olds & Lowe, P.C.

(57) ABSTRACT

A cooling system includes a cooling device, a controller and a defrosting unit. The cooling device has a compressor, a condenser, an expander, an evaporator, a cooling channel and a coolant. The coolant is functioned in the evaporator to thermally exchange with a working fluid in a pipe. The controller is adapted for controlling the temperature of the working fluid by controlling the cooling device. The defrosting unit has a switch disposed on the cooling channel and located between the compressor and the condenser, and a defrosting channel connected with the switch. After passing through the switch, the coolant is optionally fed to anyone of the cooling channel and the defrosting channel. After flowing through the defrosting channel, the coolant passes through the evaporator and then flows back to the compressor. As a result, the cooling system is capable of fast defrosting without using a heater.

4 Claims, 7 Drawing Sheets

(51) Int. Cl.
*F25B 49/02* (2006.01)
*F25B 40/00* (2006.01)

(52) U.S. Cl.
CPC .......... *F25B 49/025* (2013.01); *F25B 49/027* (2013.01); *F25B 2400/0403* (2013.01); *F25B 2400/0411* (2013.01); *F25B 2400/13* (2013.01); *F25B 2600/021* (2013.01); *F25B 2600/111* (2013.01); *F25B 2600/2507* (2013.01); *Y02B 30/741* (2013.01); *Y02B 30/743* (2013.01)

(58) Field of Classification Search
CPC ...... F25B 2400/0403; F25B 2400/0411; F25B 2400/13; F25B 2700/2117; F25B 2700/171; F25B 2700/1931; F25B 2700/1933; Y02B 30/741
See application file for complete search history.

(56) References Cited

U.S. PATENT DOCUMENTS

| | | | | |
|---|---|---|---|---|
| 2006/0168976 A1* | 8/2006 | Flynn | ...................... | F25B 9/006 62/196.4 |
| 2008/0000262 A1* | 1/2008 | Kufis | ....................... | F25B 7/00 62/513 |
| 2008/0104985 A1* | 5/2008 | Carlsen | ................. | F24F 11/0009 62/228.4 |
| 2009/0090117 A1* | 4/2009 | McSweeney | ......... | F25B 49/005 62/204 |
| 2010/0175400 A1* | 7/2010 | Kasahara | ................... | F25B 1/10 62/225 |
| 2011/0031911 A1* | 2/2011 | Marcinkiewicz | ... | H02M 1/4225 318/400.3 |
| 2011/0271703 A1* | 11/2011 | Park | ........................... | F25B 5/02 62/291 |
| 2013/0019615 A1* | 1/2013 | Choi | ........................ | B60H 1/00 62/79 |

FOREIGN PATENT DOCUMENTS

| | | |
|---|---|---|
| CN | 102997526 A | 3/2013 |
| TW | I397661 | 6/2013 |
| TW | M480652 | 6/2014 |
| TW | 201425830 A | 7/2014 |

* cited by examiner

COOLING SYSTEM CAPABLE OF DEFROSTING

BACKGROUND OF THE INVENTION

1. Field of the Invention

The present invention relates generally to cooling systems, and more particularly to a cooling system capable of defrosting, and the cooling system may provide a working fluid with temperature below 0° C.

2. Description of the Related Art

Upon testing electronic elements or electronic devices composed of electronic elements, such as wafers, integrated circuits, printed circuits, and so on, it is often important to obtain endurable temperatures of a device under test (hereinafter referred to as the "DUT"). This means the DUT has to be tested at various temperatures throughout a specific temperature range. Therefore, a temperature control system is necessary in the aforesaid testing process to control the temperature of the DUT as accurately as possible.

In a conventional temperature control system, a working fluid flowing in a pipe is cooled down by a cooling device and then directed to the surrounding of a DUT so as to cool down the DUT.

However, when the working fluid is very cold, it may frost over the inner wall of the pipe. The thickness of the frost will influence the flow rate of the working fluid. The pipe may be even blocked up by the frost, so that the temperature control system is incapable of regular operation. In such circumstance, the pipe needs to be defrosted, and the conventional way of defrosting the pipe is to shut down the temperature control system and wait for the working fluid to warm up in the ambient temperature to the temperature above 0° C., so that the frosted section in the pipe will be defrosted gradually. However, such way of defrosting is time-consuming. Alternatively, the working fluid can be warmed up quickly by a heater for raising the efficiency of defrosting. However, such way of defrosting costs relatively higher and causes energy consumption.

SUMMARY OF THE INVENTION

The present invention has been accomplished in view of the above-noted circumstances. It is an objective of the present invention to provide a cooling system which is capable of fast defrosting without using an aforesaid defrosting heater.

To attain the above objective, the present invention provides a cooling system capable of defrosting, which is adapted for cooling a working fluid flowing in a pipe. The cooling system comprises a cooling device, a controller, and a defrosting unit. The cooling device has a compressor, a condenser, an expander, an evaporator, a cooling channel, and a coolant capable of flowing in the cooling channel to cyclically pass through the compressor, the condenser, the expander and the evaporator in order. The coolant in the evaporator is functioned to thermally exchange with the working fluid flowing in the pipe and passing by the evaporator. The controller is electrically connected with the cooling device for controlling a temperature of the working fluid by controlling the cooling device. The defrosting unit has a switch disposed on the cooling channel and located between the compressor and the condenser, and a defrosting channel connected with the switch. After passing through the switch, the coolant is optionally fed to anyone of the cooling channel and the defrosting channel. After flowing through the defrosting channel, the coolant passes through the evaporator and then flowing back to the compressor.

As a result, when the cooling system performs the cooling function, the switch is functioned to let the coolant flow into the cooling channel to cyclically pass through the compressor, the condenser, the expander and the evaporator in order, so that the working fluid is cooled down by thermally exchange with the coolant passing through the evaporator. When the pipe needs to be defrosted, the cooling system can perform the defrosting function as long as the switch is switched to let the coolant after passing through the switch flow to the evaporator through the defrosting channel and then flow back to the compressor. In this way, the temperature of the coolant passing through the evaporator is high and adjustable by means of the controller, so that the working fluid is warmed up by thermally exchange with the coolant passing through the evaporator, thereby fast defrosting the pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
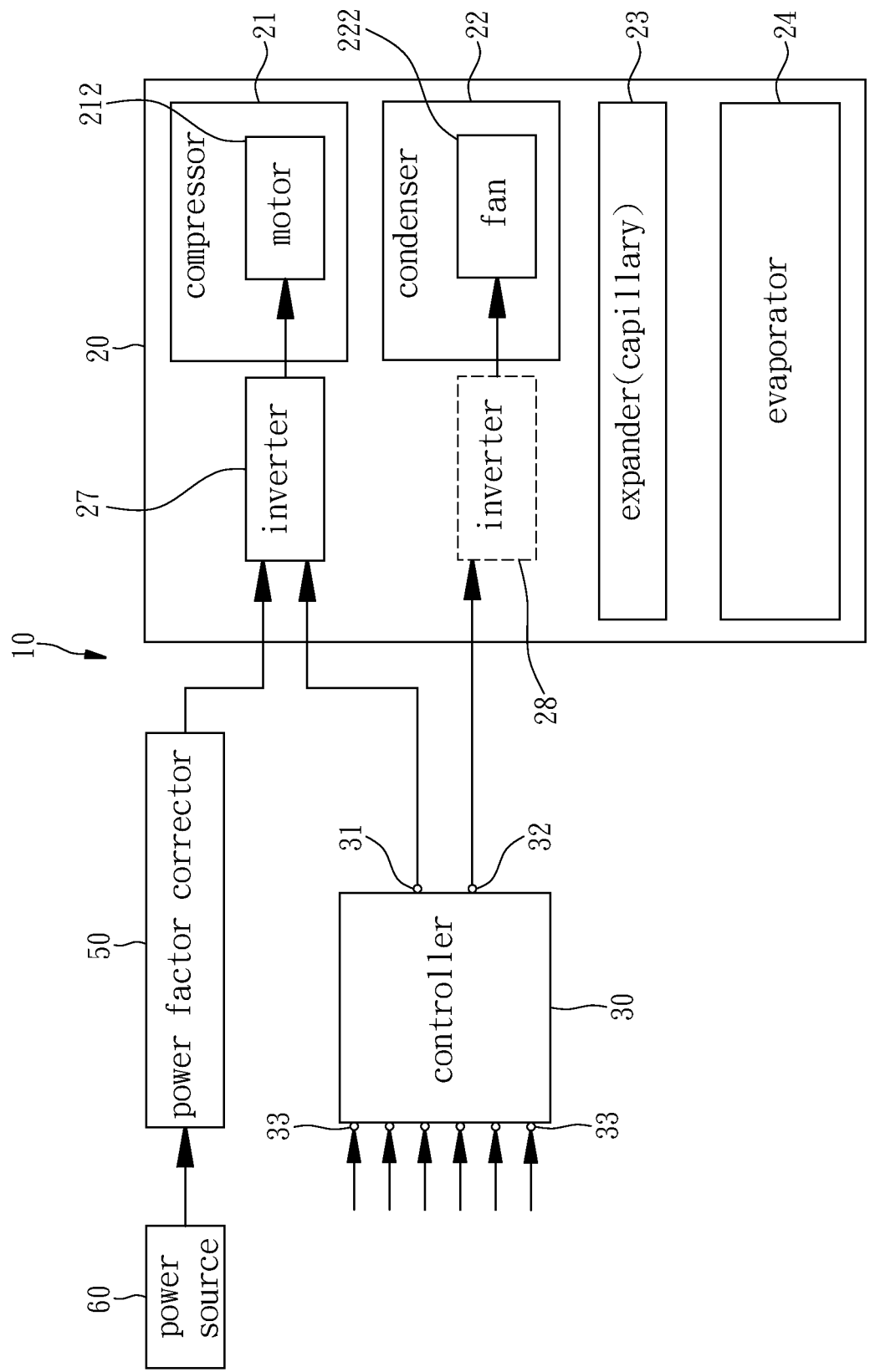
FIG. 1 is a simplified block diagram of a cooling system capable of defrosting according to a first preferred embodiment of the present invention.
Figure 2:
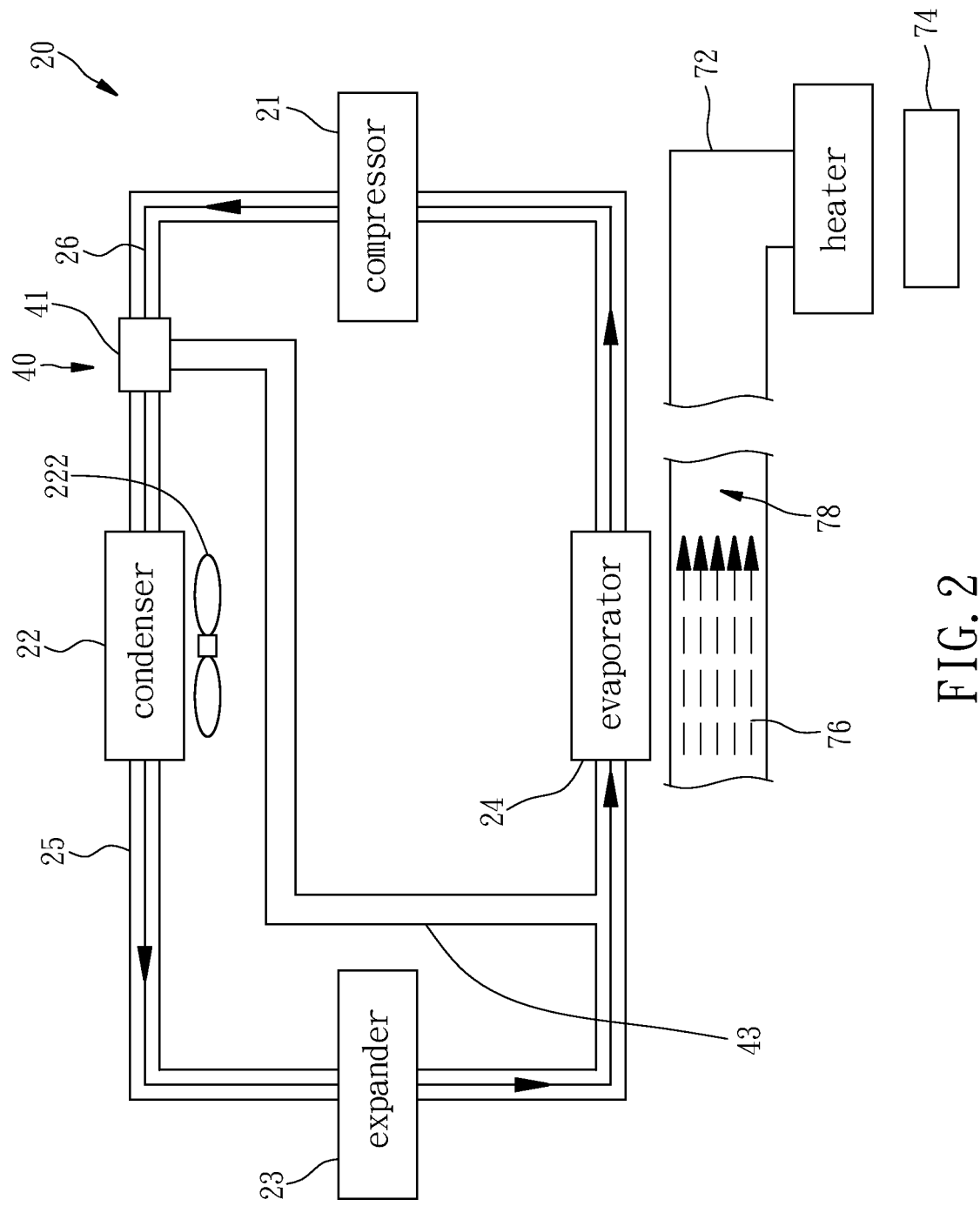
FIG. 2 is a schematic drawing of a cooling device and a defrosting unit of the cooling system capable of defrosting according to the first preferred embodiment of the present invention, and a working fluid, a pipe and a DUT, showing the status that the cooling system performs the cooling function.
Figure 3:
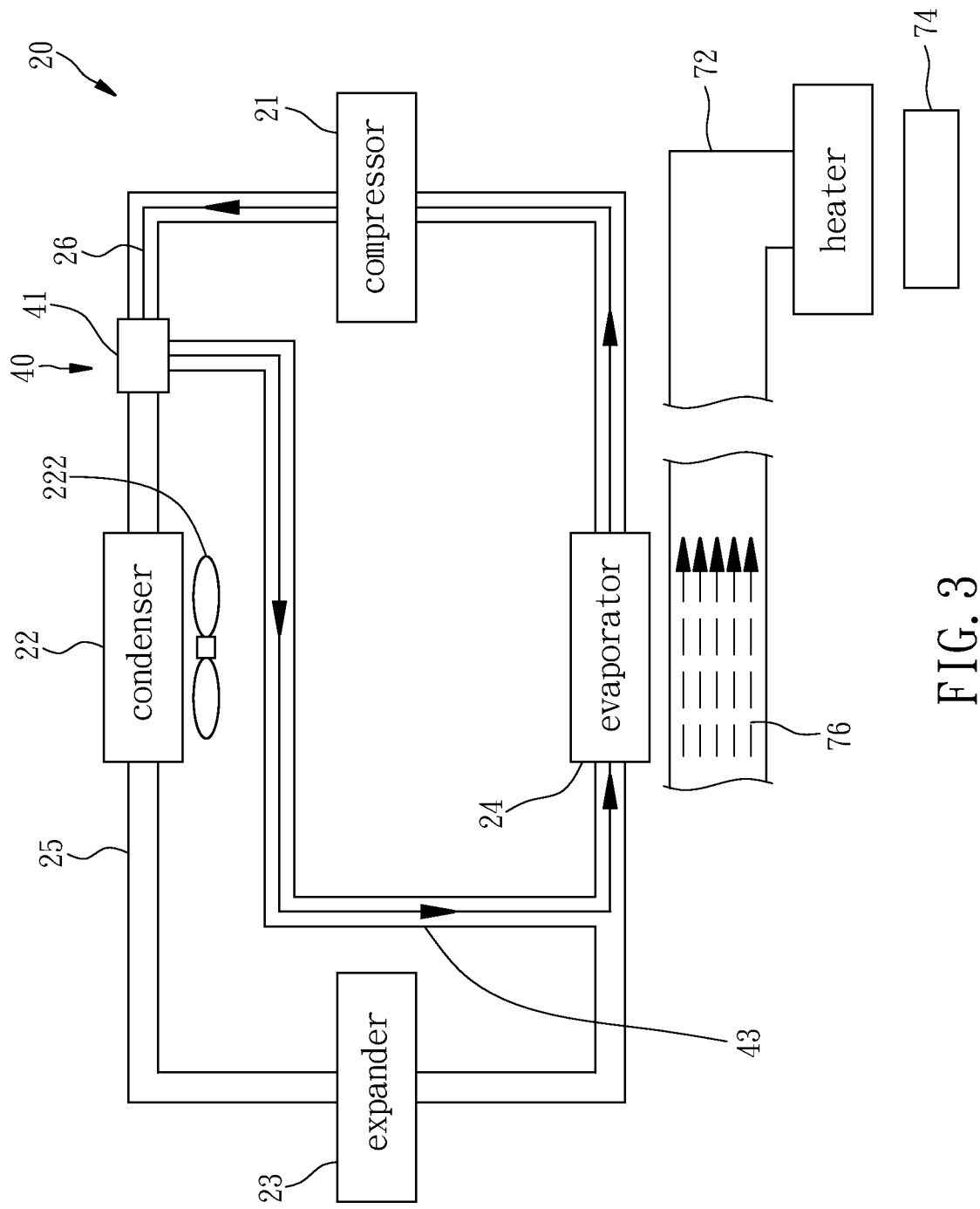
FIG. 3 is similar to FIG. 2, but showing the status that the cooling system performs the defrosting function.

Referring to FIGS. 1-3, a cooling system 10 capable of defrosting according to a first preferred embodiment of the present invention primarily comprises a cooling device 20, a controller 30, and a defrosting unit 40. The cooling system 10 may, but not limited to, further comprise a power factor corrector 50 (hereinafter referred to as the 'PFC'), through which the cooling device 20 is electrically connected with a power source 60.

The cooling system 10 is adapted for cooling a working fluid 76, which is gas or liquid flowing in a pipe 72 and directed to a DUT 74, at a target temperature set by a user. In other words, the working fluid 76 is adapted to adjust the temperature of the DUT 74 after being cooled by the cooling system 10. However, the cooling system of the present invention is not limited to be adapted for controlling the temperature of the DUT, but may be applied in another process or system that requires the working fluid with accurate temperature.

The cooling device 20 comprises a compressor 21, a condenser 22, an expander 23, an evaporator 24, a cooling channel 25, a coolant 26 capable of flowing in the cooling channel 25 to cyclically pass through the compressor 21, the condenser 22, the expander 23 and the evaporator 24 in order, and two inverters 27, 28. For the coolant 26, commercially available coolants or a mixture of at least two of commercially available coolants can be used depending on usage requirements.

The compressor 21 has a motor 212 electrically connected with the inverter 27 and controllable in rotary speed by the inverter 27. In this embodiment, the inverter 27 is electrically connected with the power source 60 through the PFC 50. For the PFC 50, a commercially available integrated circuit capable of correcting power factor can be used. The PFC 50 is capable of receiving input AC power having a wide voltage range, operating in a wide frequency range, and outputting DC power having constant voltage. The PFC 50 is adapted to receive AC power from the power source 60, which may be, but not limited to, public supply mains used in worldwide areas, and output DC power to the inverter 27 so as to drive the motor 212. In this embodiment, the inverter 27 is adapted for converting the frequency of the compressor 21 for energy conservation. However, the invariable-frequency compressor is also adapted for the cooling system and functioned without the inverter 27. In other words, the inverter 27 is optionally installed in the cooling system.

As shown in FIG. 2, when the cooling system 10 performs the cooling function, the compressor 21 is powered by the motor 212 to compress gaseous coolant 26 with low temperature and low pressure, thereby outputting gaseous coolant 26 with high temperature and high pressure and driving the coolant 26 to flow cyclically. The condenser 22 is adapted to dissipate heat of the gaseous coolant 26 with high temperature and high pressure by means of a cooling medium, e.g. air, thereby outputting liquid coolant 26 with moderate temperature and high pressure. Besides, the condenser 22 has a fan 222 which helps dissipating the heat of the coolant 26. The expander 23, e.g. capillary, is adapted to depressurize the liquid coolant 26 with moderate temperature and high pressure, thereby outputting liquid coolant 26 with moderate temperature and low pressure, so that the coolant 26 can absorb heat when passing through the evaporator 24 and thereby be vaporized to become gaseous coolant 26 with low temperature and low pressure. In this case, the coolant 26 in the evaporator 24 is functioned to thermally exchange with the working fluid 76 flowing in the pipe 72 and passing by the evaporator 24, thereby cooling the working fluid 76.

The controller 30 has a first output port 31, a second output port 32, and a plurality of input ports 33. The input ports 33 are adapted to receive a plurality of system parameters, respectively. The first output port 31 is electrically connected to the inverter 27 for enabling the controller 30 to transmit a signal for controlling the rotary speed of the motor 212 according to at least one of the received system parameters to the inverter 27. The second output port 32 is electrically connected to the inverter 28 for enabling the controller 30 to transmit a signal for controlling the rotary speed of the fan 222 according to at least one of the received system parameters to the inverter 28. It is to be understood that the cooling device 20 may be configured without having such inverter 28. In this case, the fan 222 that is switchable between several stages of rotary speed may be used. The system parameters may optionally comprise the target temperature set by a user, a temperature in the evaporator 24, a mass flow of the working fluid 76 in the pipe 72, inlet and outlet pressures of the compressor 21, and a temperature of the working fluid 76 obtained when the working fluid 76 has passed by the evaporator 24 in the pipe 72, such as the temperature obtained at a sense position 78, a downstream in the pipe 72 relative to the evaporator 24 as shown in FIG. 2. The usage of the system parameters depends on the actual demand in use of the system 10, and it may be more than or less than and is not limited to the aforesaid system parameters. The correlation between the aforesaid system parameters and the temperature of the working fluid will be specified in the following contents.

The target temperature is the temperature of the working fluid demanded to be outputted from the system to the DUT 74. If the temperature of the working fluid outputted from the cooling device 20 is close to the target temperature, it needs only a little additional adjustment by a heater, thereby causing relatively less energy waste to the heater. The optimal condition is that the temperature of the working fluid to be outputted from the cooling device 20 is lower than but very close to the target temperature after a transmission loss, and then the temperature of the working fluid is further adjusted to the target temperature by the heater when the working fluid is outputted.

The working fluid is thermally exchanged primarily when passing by the evaporator 24. Theoretically, after the working fluid passes by the evaporator 24, the temperature thereof is usually adjusted to be close to the temperature of the evaporator 24. Thus, the temperature in the evaporator 24 (internal temperature of the evaporator 24) should be included in the system parameters to be received by the controller 30 for controlling the temperature of the working fluid 76. For example, the controller shall speed up the motor 212 of the compressor 21 and the fan 222 of the condenser 22 when the target temperature is lower than the temperature in the evaporator 24 and slow down the motor 212 and the fan 222 when the target temperature is higher than the temperature in the evaporator 24.

When the working fluid outputted from the system is stable in temperature, it will have an increase in its temperature in the event that the mass flow of the working fluid increases because the heat taken away from the working fluid by the evaporator 24 maintains constant. In this condition, the motor 212 of the compressor 21 needs to be speeded up if the temperature of the working fluid outputted from the system is to be maintained to the former level, and vice versa. Thus, the mass flow of the working fluid 76 should be included in the system parameters to be received by the controller, so that the controller 30 can change the rotary speeds of the motor 212 of the compressor 21 and the fan 222 of the condenser 22 subject to the variation of the mass flow of the working fluid 76 so as to achieve the target temperature quickly.

When the cooling device 20 is just started, the inlet pressure of the compressor 21 is usually very close to the outlet pressure of the compressor 21, thereby causing a very large loading to the compressor 21 since the compressor 21 has a specific compression ratio. Therefore, the motor 212 of the compressor 21 should run in a low rotary speed when the cooling device 20 is just started, and be speeded up until the inlet pressure of the compressor 21 drops to a specific value. Thus, the inlet pressure of the compressor should be included in the system parameters so as to prevent the compressor 21 from overload when the system is just started.

In general, the cooling device is increased in cooling efficiency and lowered in output temperature of the working fluid subject to the increasing of the rotary speed of the motor of the compressor. However, the cooling device usually has a maximum pressure limitation on safety consideration, and the system is usually shut down automatically when reaching the maximum pressure for safety. Therefore, the outlet pressure of the compressor should be monitored when the motor of the compressor is speeded up. In general, the rotary speed of the motor is increased to a certain level and then kept at that level for a period of time to enable that the outlet pressure of the compressor is stable again or lower than a specific value, and then the motor is continuously speeded up to another level. Thus, the outlet pressure of the compressor should be included in the system parameters so as to enable the system to output working fluid having relatively lower temperature quickly without exceeding a safe operating pressure.

A temperature difference between the target temperature and the temperature of the working fluid having passed by and then cooled down by the evaporator 24 may exist. Further, the aforesaid temperature difference may vary according to variation of the mass flow of the working fluid. Thus, the temperature of the working fluid obtained after the working fluid has passed by the evaporator in the pipe should be included in the system parameters so that the working fluid can have a temperature very close to the target temperature when arriving at the DUT 74.

Besides, the aforesaid system parameters can be measured and/or detected by means of commercially available temperature sensors, pressure sensors, and mass flow sensors, which are disposed in specific positions in the system.

The defrosting unit 40 comprises a switch 41 disposed on the cooling channel 25 and located between the compressor 21 and the condenser 22, and a defrosting channel 43, for defrosting the pipe 72, connected with the switch 41. After passing through the switch 41, the coolant 26 is optionally fed to anyone of the cooling channel 25 and the defrosting channel 43. In other words, by switching the switch 41, the coolant 26 may be fed to the cooling channel 25 and cyclically flowing in the cooling channel 25 as shown in FIG. 2. Alternatively, as shown in FIG. 3, the coolant 26 after passing through the switch 41 may be fed to the defrosting channel 43; after flowing through the defrosting channel 43, the coolant 26 passes through the evaporator 24 and then flows back to the compressor 21.

In the case that the coolant 26 is fed to the defrosting channel 43 so as to perform the defrosting function, the coolant 26 is stopped flowing in the cooling channel 25 cyclically, and the coolant 26 with high temperature out of the compressor 21 directly flows to the evaporator 24 without passing through the condenser 22 to be cooled down. Such case is especially suitable for the situation that the working fluid is frosted in the pipe 72. Because the temperature of the coolant 26 passing through the evaporator 24 is high and adjustable by the controller 30, the working fluid 76 passing by the evaporator 24 can be warmed up fast by thermally exchange with the coolant 26 in the evaporator 24, thereby fast defrosting the pipe. For example, the coolant in the evaporator has higher temperature when the motor of the compressor rotates faster and has lower temperature when the motor of the compressor rotates more slowly, so the rotary speed of the motor of the compressor is adjustable by means of the controller according to the extent of the frost in the pipe. Besides, when the working fluid 76 is very cold (for example, below −10° C.), it may frost over the inner wall of the pipe 72. The thickness of the frost will influence and lower the flow rate of the working fluid 76. In an embodiment of the present invention, the controller 30 can control the operation of the switch 41 to perform the defrosting function according to a mass flow of the working fluid 76 in the pipe 72. But the defrosting function can also be subject to a defrosting schedule and the switch 41 may be operated manually or automatically by setting.

Figure 4:
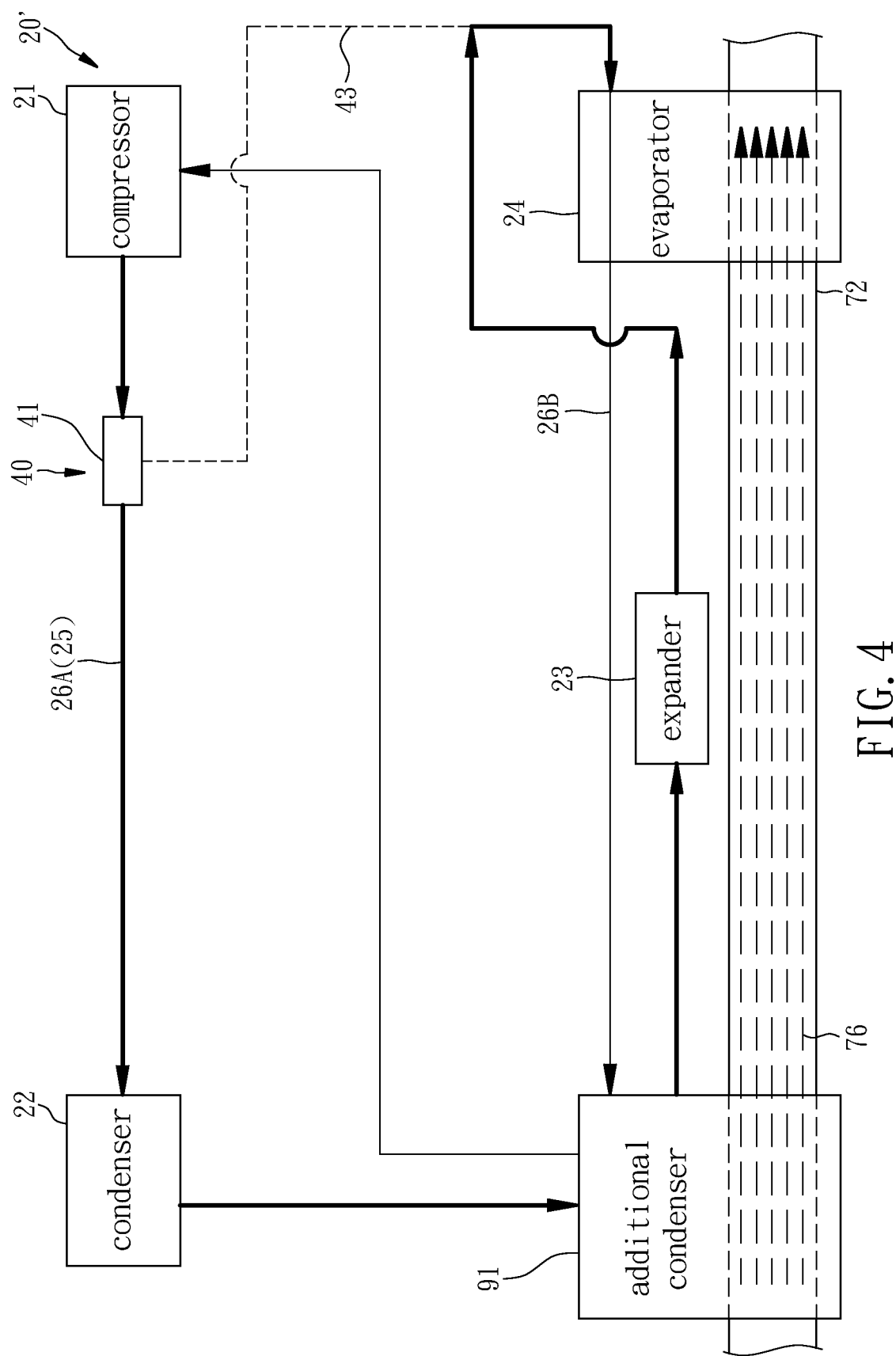
FIG. 4 is a schematic drawing of a cooling device and a defrosting unit of a cooling system capable of defrosting according to a second preferred embodiment of the present invention, and a working fluid and a pipe, showing the status that the cooling system performs the cooling function.
Figure 5:
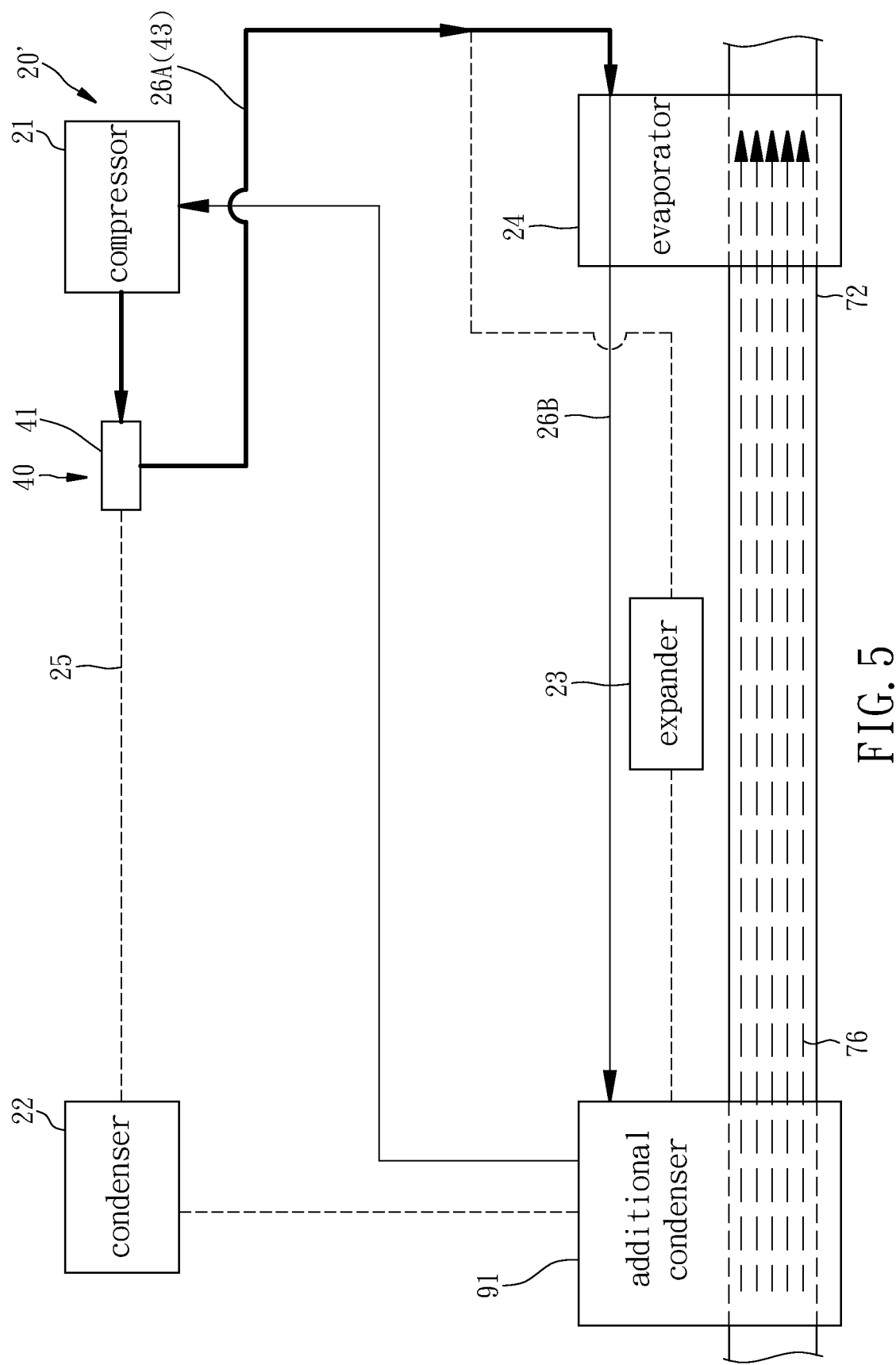
FIG. 5 is similar to FIG. 4, but showing the status that the cooling system performs the defrosting function.

Referring to FIGS. 4-5, a cooling system capable of defrosting according to a second preferred embodiment of the present invention is similar in structure to the aforesaid cooling system 10 of the first preferred embodiment with the following exceptions. That is, the cooling device 20' in this embodiment further comprises an additional condenser 91 of a dual circuit design, and optionally utilizes a coolant mixture consisting of more than one refrigerant gas.

FIG. 4 shows the status that the cooling system performs the cooling function. After the gaseous coolant 26A has been compressed within the compressor 21, the coolant 26A flows in the cooling channel 25 and passes through the air cooled condenser 22, where the heat of compression is extracted, thereby allowing some or all of the gaseous coolant 26A to condense. Then, the coolant 26A passes through a first circuit of the additional condenser 91, and via the expander 23 flows into the evaporator 24, where the condensate expands, thereby extracting heat. After flowing out of the evaporator 24, the continually expanding coolant 26B flows back to the compressor 21 through a second circuit of the additional condenser 91 in a counter-flow direction, removing additional heat, which can further enable condensation of the gaseous coolant 26A traveling through the first circuit of the additional condenser 91.

Figure 6:
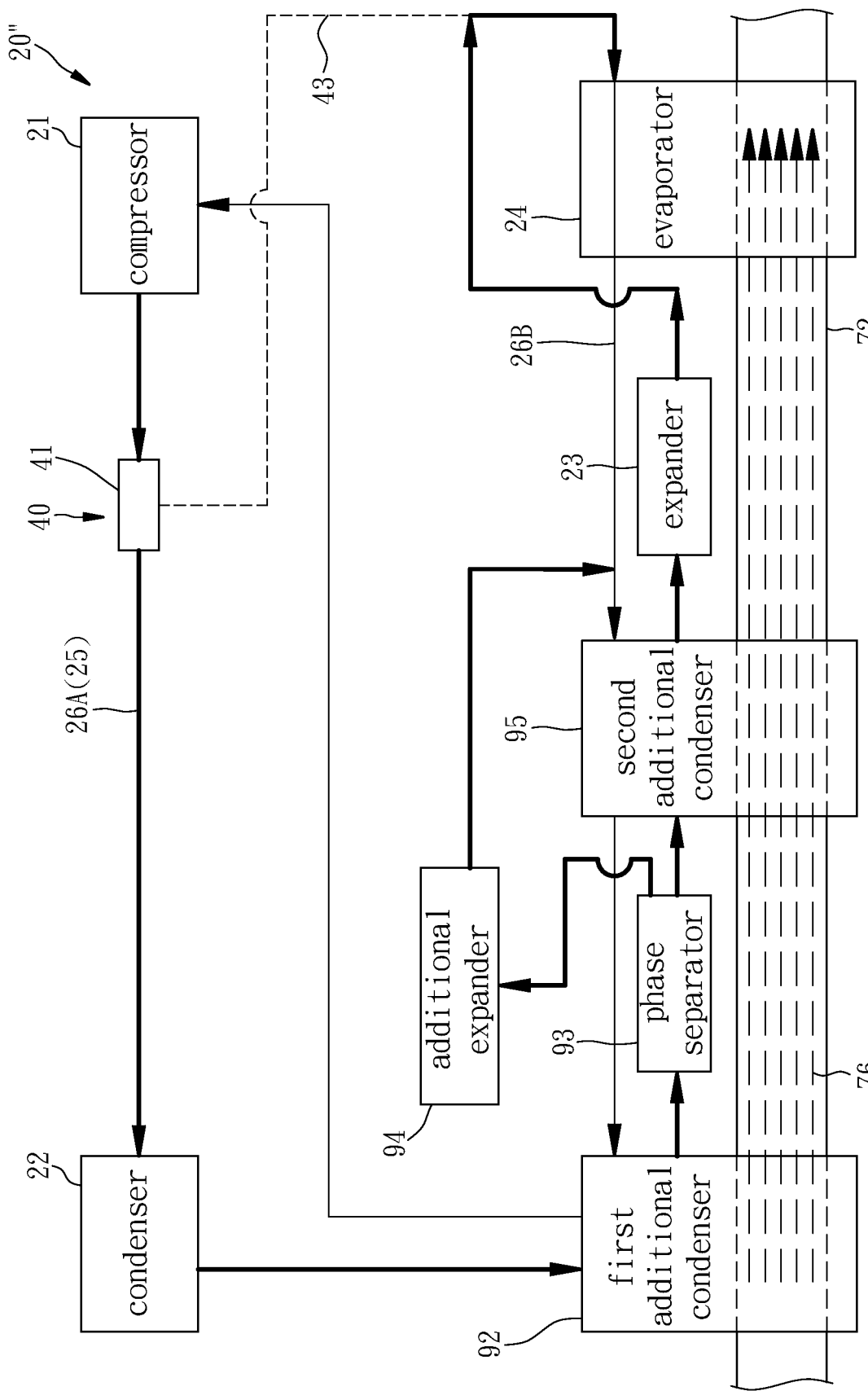
FIG. 6 is a schematic drawing of a cooling device and a defrosting unit of a cooling system capable of defrosting according to a third preferred embodiment of the present invention, and a working fluid and a pipe, showing the status that the cooling system performs the cooling function.

For the convenience of illustration and the simplification of the figures, in FIGS. 4 and 6 the thick solid line and the thin solid line respectively represent the coolant 26A flowing from the compressor 21 to the evaporator 24 and the coolant 26B flowing from the evaporator 24 to the compressor 21, and both represent the cooling channel 25 as well. In FIGS. 4 and 6 the dashed line represents the defrosting channel 43 where no coolant passes through.

In this way as shown in FIG. 4, after the coolant 26A is cooled down by the condenser 22, the coolant 26A can be further cooled down again by the additional condenser 91, such that the coolant 26A may have a relatively lower temperature when flowing through the evaporator 24, thereby enabling to cool the working fluid 76 to a relatively lower temperature. Besides, the coolant 26B flowing backwards from the evaporator 24 to the compressor 21 can be functioned to thermally exchange with the coolant 26A when flowing through the additional condenser 91, thereby further cooling down the coolant 26A, so that the cooling device 20' has relatively better cooling efficiency. Resulted from the aforesaid thermal exchange between the coolant 26A flowing to the evaporator 24 and the coolant 26B flowing backwards from the evaporator 24, the coolant 26B is raised in its temperature before flowing back into the compressor 21, which helps the liquid in the coolant 26B to be transformed into gas before the coolant 26B flows into the compressor 21, so that the compressor 21 is prevented from liquid phase compression.

In addition, the working fluid 76 flowing in the pipe 72 can be arranged to pass by the additional condenser 91 and the expander 23 before passing by the evaporator 24. In this way, the coolant 26B in the additional condenser 91 is functioned to thermally exchange with the working fluid 76 passing by the additional condenser 91, so that the working fluid 76 is pre-cooled before passing by the evaporator 24. Therefore, the working fluid 76 can be further cooled to the required temperature more quickly when passing by the evaporator 24, and the cooling system can output the working fluid with the temperature below 0° C.

FIG. 5 shows the status that the cooling system performs the defrosting function. After the coolant 26A flows out of the compressor 21 and passing through the switch 41, the coolant 26A flows into the evaporator 24 through the defrosting channel 43. The coolant 26B flowing out of the evaporator 24 flows back to the additional condenser 91 and then flows back to the compressor 21. In this way, the coolant has high temperature when passing through the evaporator 24 and the additional condenser 91, thereby capable of fast defrosting the pipe 72 by thermally exchange with the working fluid 76 or the pipe 72.

Figure 7:
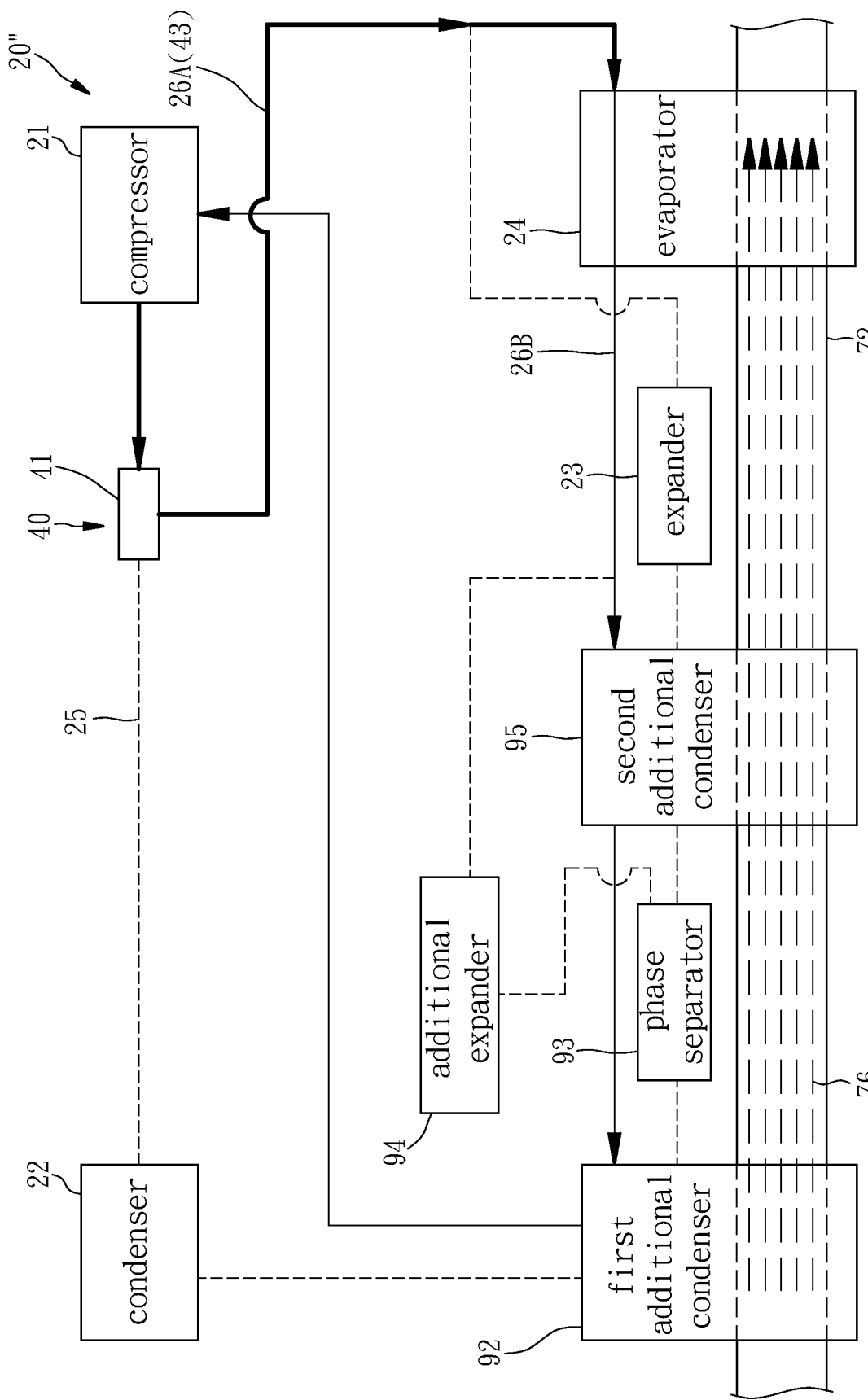
FIG. 7 is similar to FIG. 6, but showing the status that the cooling system performs the defrosting function.

For the convenience of illustration and the simplification of the figures, in FIGS. 5 and 7 the thick solid line represents not only the coolant 26A flowing from the compressor 21 to the evaporator 24, but also the defrosting channel 43 and parts of the cooling channel 25 where the coolant 26A passes through. In FIGS. 5 and 7 the thin solid line represents the coolant 26B flowing from the evaporator 24 to the compressor 21 and other parts of the cooling channel 25 where the coolant 26B passes through. In FIGS. 5 and 7 the dashed line represents the other parts of the cooling channel 25 where no coolant passes through.

Referring to FIGS. 6-7, a cooling system capable of defrosting according to a third preferred embodiment of the present invention is similar to the aforesaid cooling system 10 of the first preferred embodiment with the following exceptions. That is, the cooling device 20″ in this embodiment further comprises a first additional condenser 92, a second additional condenser 95 of a dual circuit design, a liquid/vapor phase separator 93 situated between the first and second additional condensers, and an additional expander 94. A mixture of at least two different coolant gases would then be desirable, wherein the coolant gas with the warmest boiling point would be selected to fully condense and separate in the phase separator 93. Any uncondensed coolant gases with colder boiling point would then flow through the phase separator's gas outlet and enter a first circuit of the second additional condenser 95.

Specifically speaking, when the cooling system performs the cooling function as shown in FIG. 6, the coolant 26A after flowing out of the compressor 21 and passing through the switch 41 flows in the cooling channel 25 and passes through the condenser 22 to be cooled down, and then passes through the first additional condenser 92 to be further cooled down. After that, a part of the coolant 26A with higher boiling point may be transformed into liquid, but the other part of the coolant 26A with lower boiling point is still in gas phase; therefore, the coolant 26A is arranged to flow through the phase separator 93 to let the gas and the liquid in the coolant 26A be separated from each other. After flowing out from the phase separator 93, the part of gaseous coolant 26A flows through the first circuit of the second additional condenser 95 and is cooled down once again and transformed into liquid, and then flows through the expander 23, e.g. capillary or expansion valve, to be depressurized to become gaseous coolant with low pressure, and then flows into the evaporator 24. After flowing out from the phase separator 93, the part of liquid coolant 26A flows through the additional expander 94, e.g. capillary or expansion valve, to be depressurized to become gaseous coolant with low pressure, and then flows backwards to the second additional condenser 95 for cooling down the gaseous coolant 26A in the second additional condenser 95 to transform it into liquid. In other words, the liquid coolant out of the phase separator 93 and via the additional expander 94 would return through a second circuit of the second additional condenser 95 in a counter-flow direction with the first circuit, where the expanding condensate would extract heat from uncondensed gaseous coolant traveling through the first circuit, thus enabling condensation of these gaseous coolant with colder boiling point to feed the expander 23 and the evaporator 24. The coolant 26A flowing out from the expander 23 is functioned to thermally exchange with the working fluid 76 when flowing through the evaporator 24. After flowing out from the evaporator 24, the coolant 26B flows back to the second additional condenser 95 and the first additional condenser 92, and then flows back to the compressor 21.

Because of being re-cooled by the additional condensers 92, 95, the coolant 26A in this embodiment may have a relatively lower temperature when flowing through the evaporator 24, and therefore the coolant 26A is able to cool down the working fluid 76 to a relatively lower temperature. On the other hand, the coolant 26B flowing backwards from the evaporator 24 to the compressor 21 has a very low temperature (usually below −10° C. in the first additional condenser 92 and below −40° C. in the second additional condenser 95), such that when the coolant 26B flows through the second additional condenser 95 and the first additional condenser 92, it can be functioned to thermally exchange with the coolant 26A (the temperature of the coolant 26A at the outlet of the condenser 22 is usually a little bit higher than the ambient environment temperature). Resulted from the aforesaid thermal exchange between the coolant 26A flowing to the evaporator 24 and the coolant 26B flowing backwards from the evaporator 24, the coolant 26A is further cooled down and therefore the cooling device 20″ has relatively better cooling efficiency; besides, the coolant 26B is raised in temperature before flowing back into the compressor 21, which helps the liquid in the coolant 26B to be transformed into gas before the coolant 26B flows into the compressor 21, so that the compressor 21 is prevented from liquid phase compression.

In addition, the working fluid 76 flowing in the pipe 70 can be arranged to pass by the first additional condenser 92 and the second additional condenser 95 before passing by the evaporator 24. In this way, the coolant 26B in the first and second additional condensers 92, 95 and the coolant flowing backwards from the additional expander 94 to the second additional condenser 95 are functioned to thermally exchange with the working fluid 76 passing by the additional condensers 92, 95, so that the working fluid 76 is pre-cooled before passing by the evaporator 24, and therefore the working fluid 76 can be further cooled to the required temperature more quickly when passing by the evaporator 24.

As shown in FIG. 7, when the cooling system performs the defrosting function, the coolant 26A, after flowing out of the compressor 21 and passing through the switch 41, flows into the evaporator 24 through the defrosting channel 43.

The coolant 26B flowing out of the evaporator 24 flows back to the second additional condenser 95 and the first additional condenser 92, and then flows back to the compressor 21. In this way, the coolant has high temperature when passing through the evaporator 24, the second additional condenser 95 and the first additional condenser 92, thereby capable of fast defrosting the pipe 72 by thermally exchange with the working fluid 76.

In this way, the cooling system 10 has better cooling effect, and the compressor 21 is prevented from liquid phase compression. Besides, the working fluid 76 flowing in the pipe 72 may pass by the at least one additional condenser to thermally exchange with the coolant in the at least one additional condenser, and then pass by the evaporator 24 to thermally exchange with the coolant in the evaporator 24, so that the cooling system 10 can cool down the working fluid 76 faster, output the working fluid 76 with the temperature below 0° C., and have higher efficiency of defrosting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling system capable of defrosting, which is adapted for cooling a working fluid, comprising:
   a cooling device having a compressor provided with a motor, a condenser, an expander, an evaporator, a cooling channel, at least one additional condenser, and a coolant flowing in the cooling channel to pass through the compressor, the condenser, the at least one additional condenser, the expander and the evaporator and flow back through the at least one additional condenser to the compressor in succession;
   an inverter electrically connected with the motor of the compressor for controlling a rotary speed of the motor;
   a power factor corrector electrically connected with the inverter for outputting a direct current power to the inverter to drive the motor to rotate;
   a controller electrically connected with the inverter to control the rotary speed of the motor according to a mass flow of the working fluid;
   a defrosting unit having a defrosting channel, in which the coolant that flows from the compressor flows through the evaporator and the at least one additional condenser to the compressor, and a switch disposed on the cooling channel and located between the compressor and the condenser in fluid communication with the defrosting channel to conduct the coolant to flow in one of the cooling channel and the defrosting channel; and
   a pipe disposed by the at least one additional condenser and the evaporator in a way that the working fluid flows in the pipe and passes by the at least one additional condenser to be pre-cooled by thermally exchanging with the coolant that flows in the cooling channel from the evaporator back through the at least one additional condenser and passes by the evaporator to thermally exchange with the coolant that flows in the cooling channel in the evaporator so as to be cooled down and to be directed to a device under test,
   wherein in a defrost mode, the coolant flowing in the defrosting channel continuously flows from the compressor through the evaporator and the at least one additional condenser and back to the compressor such that a part of the pipe corresponding between the evaporator and the at least one additional condenser is defrosted.

2. The cooling system capable of defrosting as claimed in claim 1, wherein the at least one additional condenser comprises a first additional condenser and a second additional condenser; the cooling device further comprises a phase separator and an additional expander; the first and second additional condensers, the phase separator and the additional expander are configured in a way that the coolant flowing into the cooling channel from the switch flows through the condenser, the first additional condenser and the phase separator, and has a part flows through the additional expander and then flows backwards to the second additional condenser, and another part flows through the second additional condenser, the expander and the evaporator and flows back to the second additional condenser, the first additional condenser to the compressor.

3. The cooling system capable of defrosting as claimed in claim 1, wherein the cooling system outputs the working fluid with a temperature below 0 degrees Celsius.

4. A cooling system capable of defrosting, which is adapted for cooling a working fluid, comprising:
   a cooling device having a compressor provided with a motor, a condenser, an expander, an evaporator, a cooling channel, at least one additional condenser, and a coolant flowing in the cooling channel to pass through the compressor, the condenser, the at least one additional condenser, the expander and the evaporator and flow back through the at least one additional condenser to the compressor in succession;
   an inverter electrically connected with the motor of the compressor for controlling a rotary speed of the motor;
   a power factor corrector electrically connected with the inverter for outputting a direct current power to the inverter to drive the motor to rotate;
   a controller electrically connected with the inverter to control the rotary speed of the motor according to a mass flow of the working fluid;
   a defrosting unit having a defrosting channel, in which the coolant that flows from the compressor flows through the evaporator and the at least one additional condenser to the compressor, and a switch disposed on the cooling channel and located between the compressor and the condenser in fluid communication with the defrosting channel to conduct the coolant to flow in one of the cooling channel and the defrosting channel; and
   a pipe disposed by the at least one additional condenser and the evaporator in a way that the working fluid flows in the pipe and passes by the at least one additional condenser to be pre-cooled by thermally exchanging with the coolant that flows in the cooling channel from the evaporator back through the at least one additional condenser and passes by the evaporator to thermally exchange with the coolant that flows in the cooling channel in the evaporator so as to be cooled down and to be directed to a device under test;
   wherein in a defrost mode, the defrosting channel is configured to defrost the pipe.

* * * * *